United States Patent
Kulkarni et al.

(10) Patent No.: US 11,702,956 B2
(45) Date of Patent: *Jul. 18, 2023

(54) IN SITU FOAM GENERATION WITHIN A TURBINE ENGINE

(71) Applicant: General Electric Company, Schenectady, NY (US)

(72) Inventors: Ambarish Jayant Kulkarni, Glenville, NY (US); Byron Andrew Pritchard, Jr., Cincinnati, OH (US); Bernard Patrick Bewlay, Schenectady, NY (US); Michael Edward Eriksen, Cincinnati, OH (US); Nicole Jessica Tibbetts, Delanson, NY (US)

(73) Assignee: General Electric Company, Schenectady, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 17/095,396

(22) Filed: Nov. 11, 2020

(65) Prior Publication Data

US 2021/0254499 A1    Aug. 19, 2021

Related U.S. Application Data

(63) Continuation of application No. 15/860,347, filed on Jan. 2, 2018, now Pat. No. 10,871,082.

(51) Int. Cl.
*F01D 25/00* (2006.01)
*B01F 23/235* (2022.01)
(Continued)

(52) U.S. Cl.
CPC .......... *F01D 25/002* (2013.01); *B01F 23/235* (2022.01); *B01F 25/3111* (2022.01);
(Continued)

(58) Field of Classification Search
CPC .................. F01D 25/002; B08B 3/003; B01F 2005/0451; B01F 2215/0077; B01F 3/04446; F05D 2220/323
See application file for complete search history.

(56) References Cited

U.S. PATENT DOCUMENTS 3,037,887 A    6/1962 Brenner et al.
3,212,762 A    10/1965 Carroll
(Continued)

FOREIGN PATENT DOCUMENTS

CN    201565020 U    9/2010
DE    102008047493 A1    4/2010
(Continued)

OTHER PUBLICATIONS

EP Application No. 18215708.1; European Search Report dated Jun. 26, 2019, 11 pages.
(Continued)

*Primary Examiner* — Marc Lorenzi
(74) *Attorney, Agent, or Firm* — Fitch, Even, Tabin & Flannery LLP

(57) ABSTRACT

A turbine system includes a foam generating assembly having an in situ foam generating device at least partially positioned within the fluid passageway of the turbine engine, such that the in situ foam generating device is configured to generate foam within the fluid passageway of the turbine engine.

10 Claims, 10 Drawing Sheets

(51) Int. Cl.
    *B01F 25/31*     (2022.01)
    *B01F 25/314*     (2022.01)
    *B01F 25/312*     (2022.01)
    *B01F 25/313*     (2022.01)
    *B01F 101/00*     (2022.01)

(52) U.S. Cl.
    CPC .... *B01F 25/3143* (2022.01); *B01F 25/31243* (2022.01); *B01F 25/31331* (2022.01); *B01F 2101/4505* (2022.01); *F05D 2220/323* (2013.01); *F05D 2230/72* (2013.01); *F05D 2260/00* (2013.01); *F05D 2260/607* (2013.01)

(56) References Cited

U.S. PATENT DOCUMENTS

| | | |
|---|---|---|
| 3,436,262 A | 4/1969 | Crowe |
| 4,133,773 A | 1/1979 | Simmons |
| 4,400,220 A | 8/1983 | Cole, Jr. |
| 4,474,680 A | 10/1984 | Kroll |
| 4,805,700 A | 2/1989 | Hoover |
| 5,018,355 A | 5/1991 | Foster |
| 5,057,174 A | 10/1991 | Anderson |
| 5,085,371 A | 2/1992 | Paige |
| 5,275,763 A | 1/1994 | Fukai |
| 5,344,079 A | 9/1994 | Tasaki |
| 5,837,168 A | 11/1998 | Rowe |
| 6,311,704 B1 | 11/2001 | Foster |
| 6,491,048 B1 | 12/2002 | Foster |
| 6,662,600 B1 | 12/2003 | Field et al. |
| 7,297,260 B2 | 11/2007 | Hjerpe et al. |
| 3,051,861 A1 | 11/2011 | Field et al. |
| 9,579,613 B2 | 2/2017 | Fawcett et al. |
| 9,708,928 B2 | 7/2017 | Sales, Jr. et al. |
| 9,821,349 B2 | 11/2017 | Griffiths et al. |
| 9,835,048 B2 | 12/2017 | Griffiths et al. |
| 9,926,517 B2 | 3/2018 | Tibbetts et al. |
| 9,957,066 B2 | 5/2018 | Belway et al. |
| 10,364,699 B2 | 7/2019 | Saenz |
| 10,426,987 B2 | 10/2019 | Pulz |
| 10,871,082 B2 * | 12/2020 | Kulkarni ............ B01F 25/3143 |
| 2013/0087175 A1 | 4/2013 | Petter et al. |
| 2015/0165392 A1 | 6/2015 | Fawcett et al. |
| 2016/0024438 A1 | 1/2016 | Tibbetts et al. |
| 2016/0067750 A1 | 3/2016 | Griffiths et al. |
| 2016/0090859 A1 | 3/2016 | Aggas |
| 2016/0158589 A1 | 6/2016 | Pulz |
| 2016/0160679 A1 | 6/2016 | Griffiths et al. |
| 2016/0186602 A1 | 6/2016 | Saenz |
| 2016/0230592 A1 | 8/2016 | Saenz |
| 2016/0236799 A1 | 8/2016 | Belway et al. |
| 2017/0167290 A1 | 6/2017 | Kulkarni et al. |

FOREIGN PATENT DOCUMENTS

| | | |
|---|---|---|
| WO | 2001034955 A1 | 5/2001 |
| WO | 2007102738 A1 | 9/2007 |

OTHER PUBLICATIONS

Fry, J.F. and French, R.J., "A Mechanical Foam-Generator for Use in Laboratories," J. Applied Chemistry, Oct. 1951, pp. 425-429.

D. Deb et al., "Automated Cleaning of Wind Turbine Blades With No Downtime," IEEE, 2017, pp. 394-399.

P.G.S.Kumar, "Dry Ice Cleaning to Improvise Dielectric Features of High Voltage Windings in Turbine Generators," IEEE, 2013, pp. 23-28.

J. Yuyang et al., "Topological Structure Design of Cleaning Manipulator for Aircraft Surfaces Based on Single-Open-Chain," IEEE, Dec. 2013, pp. 810-813.

* cited by examiner

IN SITU FOAM GENERATION WITHIN A TURBINE ENGINE

CROSS-REFERENCED APPLICATIONS

The present application is a continuation of U.S. application Ser. No. 15/860,347, entitled "IN SITU FOAM GENERATION WITHIN A TURBINE ENGINE," filed Jan. 2, 2018, which is hereby incorporated by reference in its entirety for all purposes.

BACKGROUND

The subject matter disclosed herein relates to cleaning of turbine engines. More specifically, the present disclosure relates to generation of cleaning foam.

Turbine engines (e.g., gas turbine engines, such as aircraft engines) typically combust a mixture of carbonaceous fuel and compressed oxidant to generate high temperature, high pressure combustion gases. The combustion gases drive a turbine, which may be coupled via a shaft to a compressor. In some embodiments, the shaft may also be coupled to an electrical generator. In such embodiments, as the combustion gases drive the turbine and corresponding shaft into rotation, the shaft outputs power to the electrical generator. In aircraft engines, the combustion gases may pass through the turbine and through a nozzle, causing the exhaust gas exiting the nozzle to produce thrust.

Unfortunately, turbine engines are generally susceptible to deposits or contaminants, such as dust in particular, which may reduce efficiency and/or effectiveness of the turbine engine. Generally, the deposits and contaminants may be formed or may gather in any component of the turbine engine, including but not limited to the compressor, the combustor or combustion chamber, and the turbine. Unfortunately, traditional cleaning systems and methods utilizing cleaning foam may be imprecise and inefficient. Accordingly, improved cleaning systems and methods are needed for gas turbine engines.

BRIEF DESCRIPTION

In one embodiment, a turbine system includes a foam generating assembly having an in situ foam generating device at least partially positioned within the fluid passageway of the turbine engine, such that the in situ foam generating device is configured to generate foam within the fluid passageway of the turbine engine.

In another embodiment, an in situ foam generating device of a cleaning system for a turbine engine includes an inner fluid path and an outer fluid path concentric with the inner fluid path, wherein the inner fluid path is configured to receive one of a foaming liquid or an aerating gas, and wherein the outer fluid path is configured to receive the other of the foaming liquid or the aerating gas. The in situ foam generating device also includes an interface between the inner fluid path and the outer fluid path, where the interface enables mixing of the aerating gas with the foaming liquid to generate foam.

In another embodiment, a method of cleaning a turbine engine includes generating foam, via an in situ foam generating device, from a foaming liquid and an aerating gas in an area internal to the turbine engine. The method also includes soaking a fluid passageway of the turbine engine with the foam.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
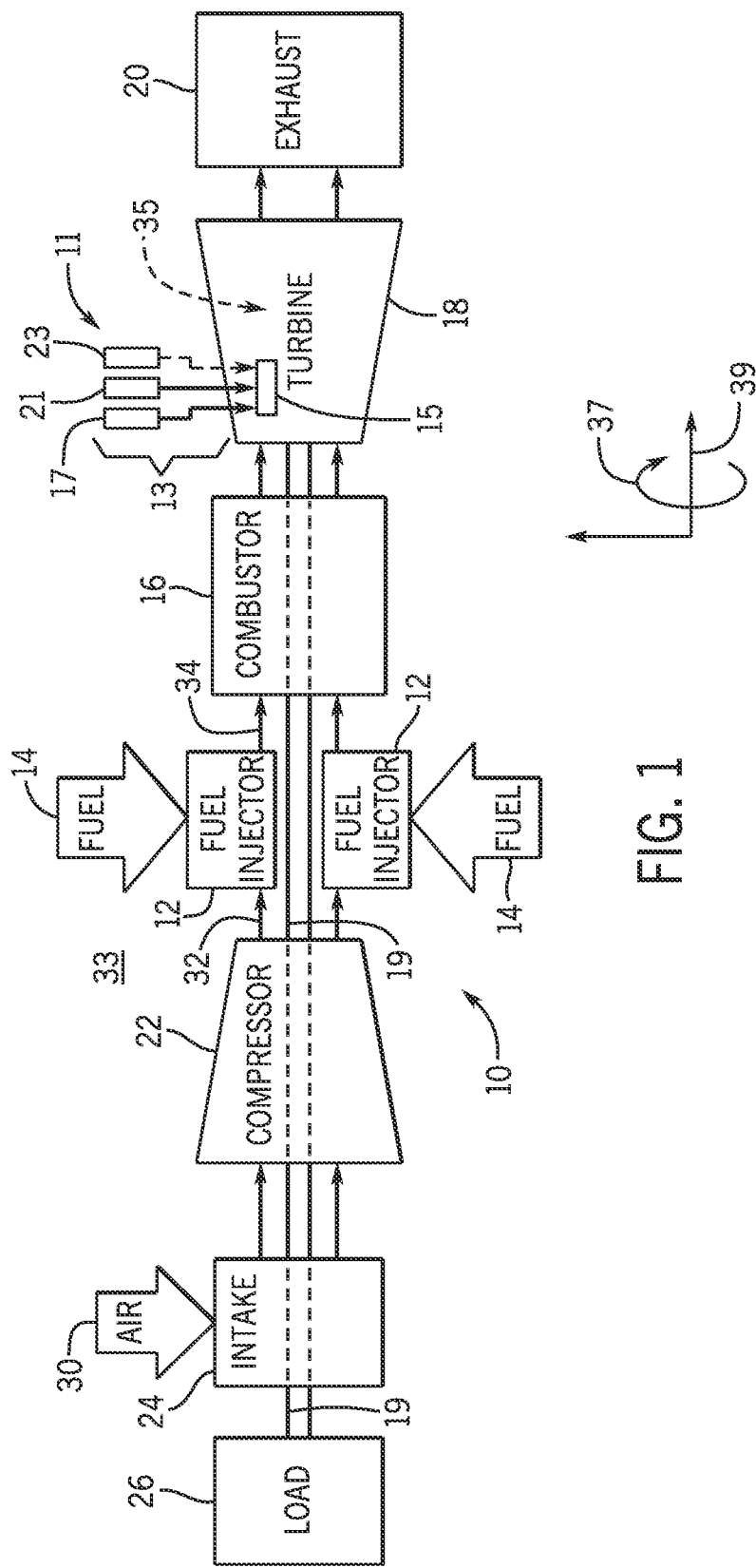
FIG. 1 is a cross-sectional schematic view of an embodiment of a turbine system having a turbine engine, a foam generating assembly, and an in situ foam generating device of the foam generating assembly, in accordance with an aspect of the present disclosure.

Turbine engines (e.g., gas turbine engines, such as certain aircraft engines) typically combust a mixture of carbonaceous fuel and compressed oxidant to generate high temperature, high pressure combustion gases, which are utilized in a number of ways depending on the type of turbine engine. For example, the combustion products may cause components of the turbine engine to output power to an electrical generator. Additionally or alternatively, the combustion products may pass through a nozzle (e.g., in an aero-derivative turbine engine) to produce thrust.

Unfortunately, gas turbine engines are generally susceptible to deposits or contaminants, such as dust in particular, which may reduce efficiency and/or effectiveness of the turbine engine. Generally, the deposits and contaminants may be formed or may gather in any component of the turbine engine, including but not limited to the compressor, the combustor or combustion chamber, and the turbine.

In accordance with present embodiments, a cleaning system for cleaning the turbine engines such as those described above includes a foam generating assembly at least partially positioned internal to the turbine engine. For example, the foam generating assembly includes an in situ foam generating device having a foam outlet that, when the in situ foam generating device is installed during a cleaning procedure, opens into a fluid passage of the turbine engine. "In situ foam generating device" used in this present specification is intended to mean that the foam generating device and the target cleaning area are both disposed internal to the turbine engine, such that the foam is generated within the turbine engine and delivered to the target within the turbine engine. In other words, materials to generate the foam are conveyed (e.g., via hoses) into the foam generating device positioned within the turbine engine, which receives the materials and generates the foam inside the turbine engine. In particular, the in situ foam generating device may be positioned within a fluid passageway (e.g., a hot gas path, a cooling circuit, or both) of the turbine engine, such that the foam is generated within the fluid passageway and delivered through the fluid passageways to one or more cleaning targets.

As noted above, materials for generating the foam may be individually conveyed to the in situ foam generating device. For example, the in situ foam generating device may receive a detergent (e.g., a liquid detergent, such as a water-based detergent containing citric acid) or other foaming liquid and an aerating gas (e.g., air, nitrogen), and may mix the detergent and the aerating gas to generate bubbles. The bubbles may be directed from an outlet of the foam generating device toward general and/or targeted areas of the turbine engine for cleaning the turbine engine. The in situ foam generating device may be coupled with a detergent storage source or tank (e.g., via a detergent hose), and an intervening flow biasing device (e.g., a pump) may be controlled to supply the detergent from the detergent storage tank, through the hose, and to the in situ foam generating device. Likewise, the in situ foam generating device may be coupled to an aerating gas source or tank (e.g., via an aerating gas hose), and an intervening flow biasing device (e.g., a fan or blower) may be controlled to supply the aerating gas from the detergent storage tank, through the hose, and to the in situ foam generating device. In some embodiments, the detergent hose and the aerating gas hose may be concentric with each other proximate the in situ foam generating device. In other words, in some embodiments, the aerating gas hose may be encapsulated by the detergent hose, or vice versa, adjacent the in situ foam generating device.

As described above, the in situ foam generating device may generate foam in an area internal to the turbine engine (e.g., within a fluid passageway of the turbine engine). In doing so, foam quality may be improved compared to embodiments in which foam is generated external to the turbine engine and subsequently routed to the turbine engine. For example, bubbles generated via traditional external generators must be routed into the turbine engine, which may cause undesired expansion of the foam bubbles. The undesired expansion of the foam bubbles may cause at least certain of the bubbles to be too large to pass through certain openings, orifices, or regions of the fluid passageway of the turbine engine. Additionally, as the foam bubbles are routed between the traditional external foam generator and the turbine engine and grow in size, a large percentage of the foam bubbles may collapse prior to contacting, soaking, or otherwise adequately cleaning the inside of the turbine engine, thereby reducing an efficiency of the cleaning procedure. The in situ foam generating device of the present disclosure facilitates improved bubble diameter and improved bubble collapse percentages, thereby improving a cleaning precision and efficiency of the cleaning system. In other words, since the in situ foam generating device facilitates more precise bubble qualities and does not require a large traversal distance to the turbine engine, the bubbles are more effective and require less resources (e.g., detergent, water, and aerating gas) than traditional embodiments.

Further to the points above, the in situ foam generating device may be configured (e.g., sized) such that it is capable of being positioned through various ports of the turbine engine (e.g., borescope inspection ports, igniter ports, fuel nozzle orifices), a throat area of the turbine engine (e.g., if properly sized), and/or between rotor blades and a stator of the turbine engine. Accordingly, the in situ foam generating device supplies improved bubbles closer to targeted areas that would otherwise be difficult to clean in traditional embodiments. In other words, the in situ foam generating device facilitates improved bubble quality for general cleaning, in addition to improved access to targeted areas of the turbine engine that are traditionally difficult to reach.

Further still, in part because of the advantages described above, more cost effective materials having lower foam stability may be used to generate the foam in disclosed internal foam generation embodiments. For example, since the bubbles in the disclosed internal foam generation embodiments are closer to the areas of the turbine engine requiring cleaning, the bubbles may not need to maintain bubble integrity for as long as a volume of bubbles that requires passage to the turbine engine from an external foam generator. In other words, because the foam bubbles in disclosed embodiments are closer to the turbine cleaning areas than those in externally generated embodiments, a higher collapse rate may be desired as a means to reduce material cost and reduce a cleaning time period. Indeed, using materials with lower foam stability may enable the improved material cost and may enable the shorter cleaning time. These and other features will be described in detail below with reference to the drawings.

Turning now to the drawings, FIG. 1 is a block diagram of a turbine system 10 and a cleaning system 11 configured to clean the turbine system 10. The turbine system 10 includes a fuel injector 12, a fuel supply 14, a combustor 16, and a turbine 18. As illustrated, the fuel supply 14 routes a liquid fuel and/or gas fuel, such as natural gas, to the gas turbine system 10 through the fuel injector 12 and into the combustor 16. As discussed below, the fuel injector 12 is configured to inject and mix the fuel with compressed air. The combustor 16 ignites and combusts the fuel-air mixture, and then passes hot pressurized exhaust gas into the turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

The turbine system 10 may be susceptible to gathering of deposits or contaminants, namely dust, within components of the turbine system 10. Accordingly, as illustrated, the turbine system 10 includes the cleaning system 11 fluidly coupled to at least one component of the turbine system 10. For example, the illustrated cleaning system 11 includes a foam generating assembly 13 having an in situ foam generating device 15. The in situ foam generating device 15 is illustrated as positioned within the turbine 18, although the in situ foam generating device 15 may be positioned internal to a different component of the turbine system 10, such as the air intake(s) 24, the compressor 22, the fuel injector(s) 12, the combustor(s) 16, the turbine 18, and/or the exhaust outlet 20. The in situ foam generating device 15 is configured to receive a foaming liquid or, more specifically, a detergent (e.g., liquid citric acid based detergent) from a detergent source or storage tank 17, and aerating gas (e.g., air, nitrogen) from an aerating gas source or storage tank 21. In some embodiments, a surfactant may be mixed with the detergent at the detergent storage tank 17, or at any location downstream of the detergent storage tank 17. The in situ foam generating device 15 may mix the detergent and the aerating gas to form bubbles inside a fluid passageway 35 of the turbine 18 (and/or other components of the turbine system 10). The fluid passageway 35 may include a hot gas path of the turbine system 10, a cooling circuit of the turbine system 10, or both. In general, the in situ foam generating device 15 may be configured (e.g., sized, shaped) to be disposed internal to the turbine 18 (and/or other components of the turbine system 10) by passing the in situ foam generating device 15 through a port of the turbine system 10. As described above and in detail below with reference to the drawings, the in situ foam generating device 15 enables an improved foam quality compared to traditional embodiments, enhancing an efficiency of the cleaning procedure in terms of both cost and time. Although the components of the turbine system 10 in FIG. 1 are illustrated as separate blocks, the components (or certain components) may connected such that the fluid passageway 35 extends continuously through multiple ones of the components of the turbine system 10 (e.g., the turbine 18, the combustor 16, the fuel injectors 12, the compressor 22, the air intake 24, or a combination thereof).

The cleaning system 11 in FIG. 1 is configured to generate, and provide to the component(s) of the gas turbine system 10, a foam output from the in situ foam generating device 15 into the fluid passageway 35 of the turbine system 10. The foam loosens, soaks, absorbs, and/or cleans the deposits or contaminants, namely dust, within the components of the turbine system 10. The cleaning system 11 may also include components configured to rinse the gas turbine system 10 after the detergent based foam soaks the insides of the components of the gas turbine system 10 for a defined period of time. For example, a flushing assembly 23 may rinse or flush the effluent (e.g., collapsed foam and contaminants) from the turbine system 10 (e.g., with jets of water). Although the flushing assembly 23 is illustrated as interfacing with the turbine system 10 at a similar location as the in situ foam generating device 15 of the foam generating assembly 13, the flushing assembly 23 may access the turbine system 10 at a different location.

Figure 2:
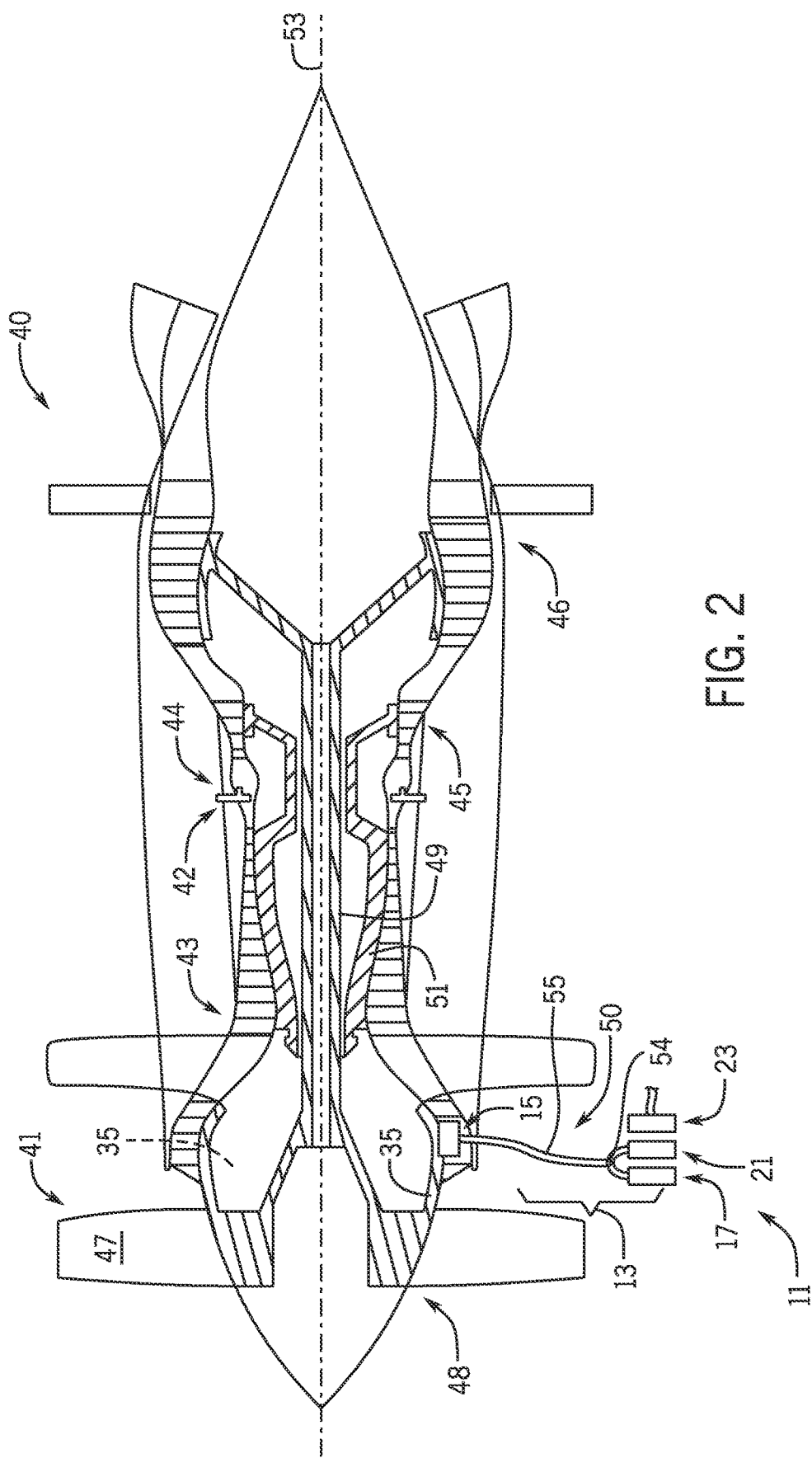
FIG. 2 is a cross-sectional schematic view of an embodiment of an aircraft turbine engine having a foam generating assembly with an in situ foam generating device for cleaning the aircraft turbine engine, in accordance with an aspect of the present disclosure.

FIG. 2 illustrates a cross-sectional schematic view of an embodiment of the cleaning system 11 and an aircraft gas turbine engine 40 (e.g., aero-derivative gas turbine engine) that includes a fan assembly 41 and a core engine 42 including a high pressure compressor 43, a combustor 44, a high-pressure turbine (HPT) 45, and a low-pressure turbine (LPT) 46. In general, the cleaning system 11 may be equipped with the in situ foam generating device 15 positioned within the fluid passageway 35 of the aircraft gas turbine engine 40, as previously described. The illustrated aircraft gas turbine engine 40 may be an example of the gas turbine system 10 illustrated in FIG. 1. In the illustrated embodiment, the fan assembly 41 of the gas turbine engine 40 (e.g., aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flow (not shown) from the combustor 44 drives the turbines 45 and 46. The HPT 45 drives the compressor 43 by way of the shaft 51, and the LPT 46 drives the fan assembly 41 by way of the shaft 49. Moreover, in operation, foreign material, such as mineral dust, is ingested by the gas turbine engine 40 along with the air, and the foreign material accumulates on surfaces therein.

Figure 3:
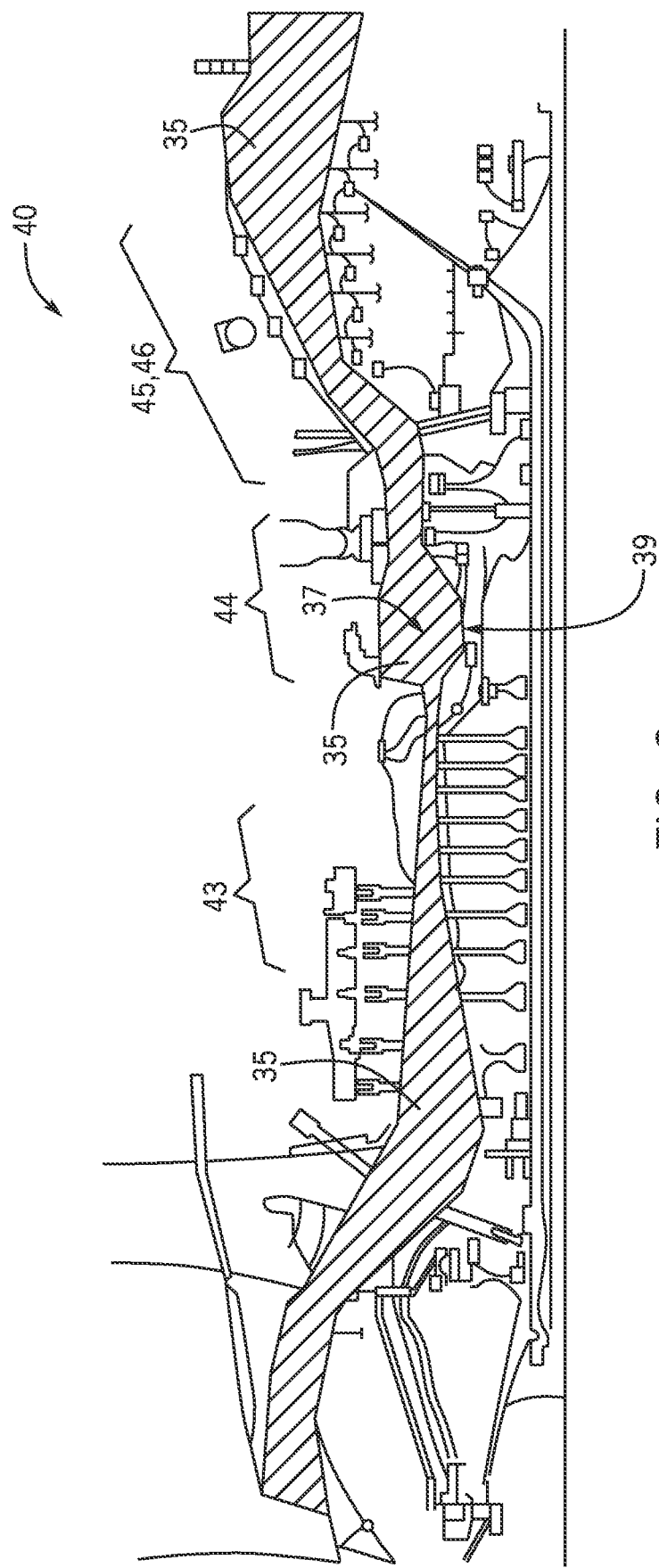
FIG. 3 is a cross-sectional schematic view of an embodiment of a cleaning volume or fluid passageway of the aircraft turbine engine of FIG. 2, in accordance with an aspect of the present disclosure.

As shown, the cleaning system 11 includes a foam generating assembly 13 having the in situ foam generating device 15, the detergent storage tank 17 (or source), the aerating gas storage tank 21 (or source), and a hose assembly 50 for routing the detergent and the aerating gas from the storage tanks 17, 21 to the in situ foam generating device 15. The hose assembly 50 in the illustrated embodiment includes, downstream from a hose juncture 54, a dual-hose portion 55 in which the hose assembly includes an inner hose that receives either the aerating gas or the detergent, and an outer hose encapsulating the inner house and configured to receive, between an inner wall of the outer house and an outer wall of the inner hose, the other of the detergent or the aerating gas. However, other arrangements of the hose assembly 50 are also possible and will be described with reference to later figures. The in situ foam generating device 15 is configured to receive the aerating gas and the detergent while the in situ foam generating device 15 is positioned within the aircraft gas turbine engine 40, generate the foam, and supply the foam to the fluid passageway 35. The flushing assembly 23 of the cleaning system 11 may be configured to rinse the effluent from the fluid passageway after a soaking period lapses. For clarity, another example of an embodiment of the fluid passageway 35 extending continuously through various components of the gas turbine engine 40 of FIG. 2 (e.g., through at least the compressor 43, the combustor 44, and the turbine stages 45, 46) is shown in FIG. 3. In FIG. 3, the fluid passageway 35 may include a hot gas path 37 and a cooling circuit 39, where the hot gas path 37 is depicted schematically in FIG. 3 as a center of the fluid passageway 35, and the cooling circuit 39 is depicted schematically in FIG. 3 as surrounding the hot gas path 37 (e.g., along an edge of the hot gas path 37). It should be noted that the cooling circuit 39 may be substantially fluidly isolated from the hot gas path 37. Further, the disclosed in situ foam generating device 15 may access the hot gas path 37 and the cooling circuit 39 independently or simultaneously.

Figure 4:
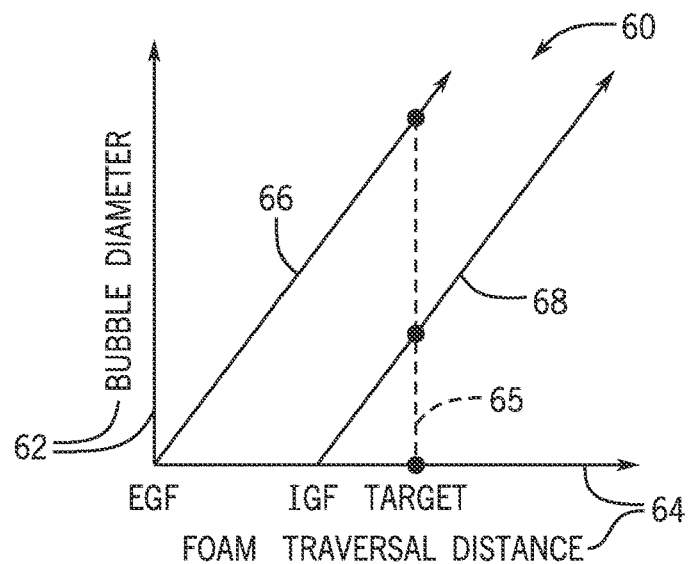
FIG. 4 is a plot illustrating certain technical effects associated with the in situ foam generating device of FIGS. 1 and 2, in accordance with an aspect of the present disclosure.
Figure 5:
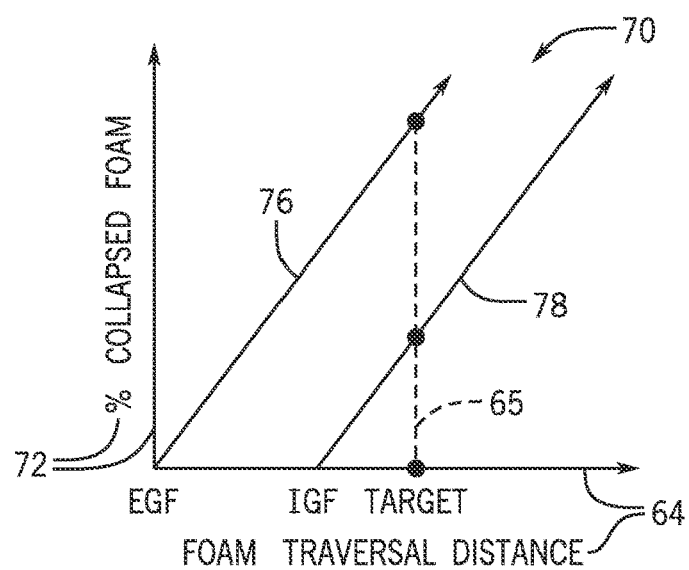
FIG. 5 is another plot illustrating certain technical effects associated with the in situ foam generating device of FIGS. 1 and 2, in accordance with an aspect of the present disclosure.
Figure 6:
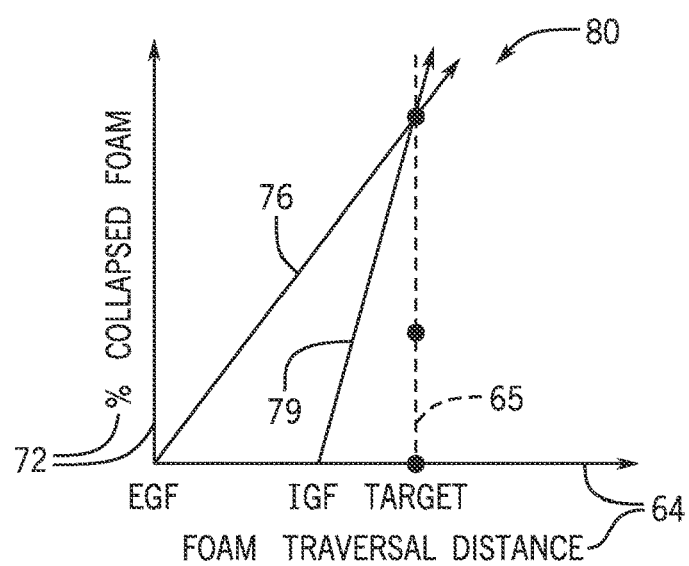
FIG. 6 is another plot illustrating certain technical effects associated with the in situ foam generating device of FIGS. 1 and 2, in accordance with an aspect of the present disclosure.

While FIGS. 7-16 illustrate various aspects of the foam generating assembly 13 having the in situ foam generating device 15, FIGS. 4-6 are first provided and described to depict certain advantages associated with in situ foam generation. For example, FIG. 4 includes a plot 60 illustrating bubble diameter 62 as a function of bubble traversal distance 64. In traditional embodiments, foam is generated external to a turbine engine, routed to the turbine engine, and then routed to a particular location or target 65 within the turbine engine (e.g., as illustrated by the external foam generation bubble size data 66). Using in situ foam generation in accordance with the present disclosure, the foam is generated inside the turbine engine, in some cases immediately adjacent the target 65 (e.g., as illustrated by the internal foam generation bubble size data 68). During foam traversal, the bubbles forming the foam may expand. Since traditional embodiments require a larger traversal distance than the in situ embodiments described by the present disclosure, the bubbles may include larger bubble diameters once the bubbles reach the target 65. Bubbles having too large of a diameter may have difficulty passing through smaller areas, openings, orifices, or fluid paths inside the turbine, which may reduce an effectiveness of the cleaning procedure. Accordingly, the smaller and more controllable bubble sizes associated with internal foam generation may be desired for improved efficiency and effectiveness of the cleaning procedure. In general, bubble diameters between 25 microns and 1 millimeter are desirable. Further, by utilizing the in situ foam generation, the bubbles may expand in size along the traversal distance between the in situ foam generation device and the target cleaning area by no more than 500%. In some embodiments in accordance with the present disclosure, the bubbles may increase in size along the traversal distance no more than 400%, no more than 300%, or no more than 200%, depending on a proximity of the generating device and the target cleaning area (i.e., the traversal distance).

It should be noted that, while not included in the plots 60, 70, and 80 illustrated in FIGS. 4-6, foam temperature is another factor dependent on traversal distance. For example, as the foam travels from the generating device toward the target cleaning position or region, a temperature of the foam may decrease as energy is lost. By generating the foam internal to the turbine engine, the loss of energy or temperature may be reduced, thereby reducing or negating cleaning cycles that produce foam having insufficient temperature. Since the traversal distance of internally generated foam is less than that of externally generated foam, the temperature of the internally generated foam may be more controllable and less reliant on features involved during foam traversal (e.g., ambient temperature, imperfections along the traversal distance, etc.). Additionally or alternatively, in some embodiments, the initial starting temperature of the internally generated foam may be less than the initial starting temperature of traditional externally generated foam, which may reduce a cleaning cost. In accordance with certain embodiments, the foam may be generated with an initial temperature of approximately 85-125 degrees Celsius, and may be delivered to the target cleaning region at a temperature of approximately 70-105 degrees Celsius. In general, the temperature of the foam in accordance with present embodiments may drop by 20% or less along the traversal distance from the in situ foam generating device and the target cleaning area, region, or point.

It should also be noted that FIG. 4 assumes a comparable initial bubble size between the externally generated foam and the internally generated foam. Although it appears as though the externally generated foam could be generated with a smaller initial bubble diameter than that of the internally generated foam such that the externally and internally generated foam embodiments include comparable bubble size at the target 65, bubbles having different initial bubble diameters behave differently. For example, bubbles having smaller initial diameters may coarsen at a higher rate (e.g., as an inverse function of the bubble diameter or radius) than those having larger initial diameters, which may cause a poor bubble size distribution, may cause expansion and/or collapsing of the bubbles, and in general may reduce an effectiveness of the foam. Further, a minimum bubble diameter for foam generated to clean turbine engines is approximately 0.10 millimeters or 0.05 millimeters, depending on features such as materials/devices used. In other words, bubble diameter is more controllable (and/or evenly distributed) for delivery to the target 65 with internal foam generation than with external foam generation, even if the bubbles in external foam generation include smaller initial diameters.

FIG. 5 includes a plot 70 illustrating bubble collapse percentage 72 as a function of the foam traversal distance 64. Similar to the plot 60 illustrating bubble diameter 62 as a function of the foam traversal distance 64, the plot 70 illustrates advantages of internal foam generation compared to external foam generation. For example, as the foam travels between the foam generating device and the target 65, the bubbles forming the foam may expand until they collapse. Of course, certain bubbles will expand and collapse at different rates; thus, the volume of foam may include a percentage of collapsed foam that increases as a function of traversal distance 64. Since embodiments having external foam generation require a greater traversal distance (i.e., represented by the external foam generation collapse percentage data 76 in the illustrated plot 70), a larger percentage of the bubbles forming the foam collapses by the time the volume of foam reaches the target 65 than embodiments having internal foam generation (i.e., represented by the internal foam generation collapse percentage data 78 in the illustrated plot 70). Reducing a percentage of bubbles that collapse before reaching the target 65 may improve effectiveness of the cleaning procedure.

The plot 70 included in FIG. 5 assumes that the same detergent and aerating gas is used for the external foam generation and the internal foam generation. The illustrated plot 70 illustrates how, assuming the same materials, the internal foam generation can enable a reduced amount of collapsed bubbles at the target 65.

Additionally or alternatively, internal foam generation may enable the use of cheaper, less stable materials to generate the foam. For example, FIG. 6 includes another plot 80 illustrating the bubble collapse percentage 72 as a function of the foam traversal distance 64. Similar to the plots 60, 70 above, the plot 80 illustrates advantages of internal foam generation compared to external foam generation. For example, cheaper and less stable materials may be selected for the external foam generating embodiments such that a rate of bubble collapse is increased compared to internal foam generating embodiments utilizing more stable materials. Indeed, while FIGS. 5 and 6 both plot bubble collapse percentage 72 as a function of traversal distance 64, the internally generated foam data 79 in FIG. 6 includes a different (i.e., greater) slope than any of the other foam data 76, 78 in FIGS. 5 and 6, since the internally generated foam data 79 in FIG. 6 is indicative of a foam formed by less stable, more cost-effective materials than that of the other foam data 76, 78. In other words, FIG. 6 illustrates how the reduced traversal distance 64 associated with in situ foam generation, coupled with the use of less stable materials, may result in the internally generated bubbles of the internal foam data 79 of FIG. 6 having the same collapse percentage 72 at the target 65 as externally generated bubbles utilizing more stable materials. In addition to material cost savings, the bubbles associated with the internal bubble generation data 79 of FIG. 6 and formed by less stable materials will collapse faster after reaching the target 65 (e.g., during a soaking period), which reduces an amount of time required to clean the turbine engine. By reducing a time required for the cleaning period, a turbine engine maintenance period is reduced. The less stable materials may include a more cost effective detergent, a more cost effective aerating gas, a more cost effective ratio of detergent to aerating gas, a more cost effective surfactant, or a combination thereof. As suggested in the illustrations, the more cost-effective, less stable materials in the internally generated foam data 79 of FIG. 6 could not be used with an external foam generator, since the collapse percentage would be far too high.

Figure 7:
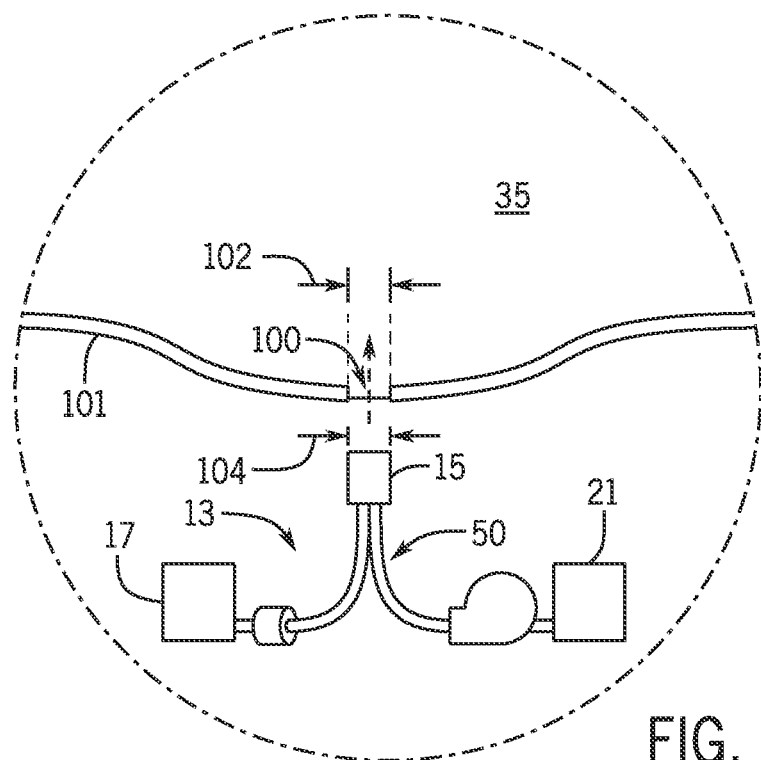
FIG. 7 is a schematic illustration of a portion of the turbine system of FIG. 1 prior to insertion of the in situ foam generating device into the turbine engine, in accordance with an aspect of the present disclosure.
Figure 8:
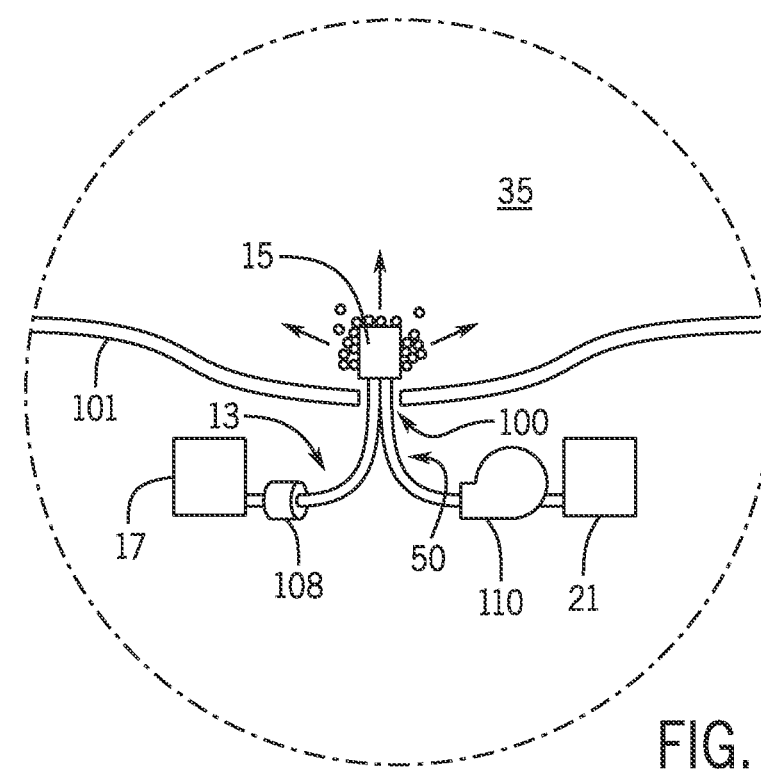
FIG. 8 is a schematic illustration of a portion of the turbine system of FIG. 1 after insertion of the in situ foam generating device within the turbine engine, in accordance with an aspect of the present disclosure.

FIGS. 7 and 8 are schematic illustrations of the foam generating assembly 13 having the in situ foam generating device 15 being inserted through a port 100 of a component of a turbine engine 101. As previously described, the port 100 may be an existing port (e.g., a borescope inspection port, an ignitor port, a fuel nozzle orifice, or some other opening in the turbine engine 101). The in situ foam generating device 15 may be sized to fit through the port 100. For example, as illustrated in FIG. 7, a maximum diameter or width 104 of the in situ foaming device 15 is less than a minimum diameter or width 102 of the port 100. The minimum diameter or width 102 of the port 100 may be one inch (approximately 25 millimeters), one half inch (approximately 13 millimeters), or one quarter inch (approximately 6 millimeters), depending on the embodiment and/or port 100. Thus, the maximum diameter or width 104 of the in situ foaming device 15 (or the portion thereof passing through the port 100) may be less than one inch, one half inch, or one quarter inch. Accordingly, as illustrated in FIG. 8, the in situ foaming device 15 is capable of passing through the port 100 for positioning inside the component of the turbine engine 101.

As previously described, a hose arrangement 50 may couple the in situ foaming device 15 with the detergent storage tank 17 (or source) and the aerating gas detergent storage tank 21 (or source). The hose arrangement 50 may include two separate, side-by-side hoses as shown, or the hose arrangement 50 may include at least a portion having an outer hose encapsulating an inner hose, where the outer hose routes one of the detergent or aerating gas, and the inner hose routes the other of the detergent or aerating gas (e.g., as illustrated in, and described with respect to, FIG. 2). As will be appreciated in view of later figures, the in situ foaming device 15 may include inner and outer fluid paths that couple with the aforementioned inner and outer hoses. However, the side-by-side hose arrangement 50 illustrated in FIGS. 7 and 8 may also be capable of interfacing with inner and outer fluid paths of the in situ foaming device 15 (e.g., via a manifold or juncture configuration positioned at or within the in situ foaming device 15). Other aspects of the in situ foaming device 15 will be described in detail below with reference to FIGS. 9-16.

Since the detergent may be a liquid based citric acid detergent, a flow biasing device such as a pump 108 may be used to route the detergent from the tank 17 to the in situ foam generating device 15. As previously described, the detergent may also include a surfactant mixed therein (e.g., at the tank 17 or elsewhere). A flow biasing device such as a fan 110 or blower may be used to route the aerating gas from the tank 21 to the in situ foam generating device 15. The foam generating assembly 13 (e.g., of the cleaning system) may include the in situ foam generating device 15, the hoses of the hose arrangement 50, the pump 108 and the tank 17, the fan 110 and the tank 21, or a combination thereof.

FIGS. 9-16 illustrate various embodiments of the in situ foam generating device. It should be noted that, while certain of FIGS. 9-16 illustrate in situ foam generating devices having axisymmetric and/or cylindrically arranged flow paths and features, any of the illustrated embodiments may include non-axisymmetric and/or non-cylindrical arrangements. Indeed, the devices may be rectangular, triangular, cylindrical, hexagonal, octagonal, irregular, or otherwise shaped. Further, the features (e.g., inner and outer fluid paths, or other features) of the device may be centered on a longitudinal axis, or one or more of the features (e.g., the inner fluid path, the outer fluid path, or both, or other features) may be offset from, or not centered on, the longitudinal axis. Certain of FIGS. 9-16 are illustrated and/or described as axisymmetric and/or cylindrical for purposes of clarity, but any of FIGS. 9-16 may include non-axisymmetric and/or non-cylindrical arrangements.

Figure 9:
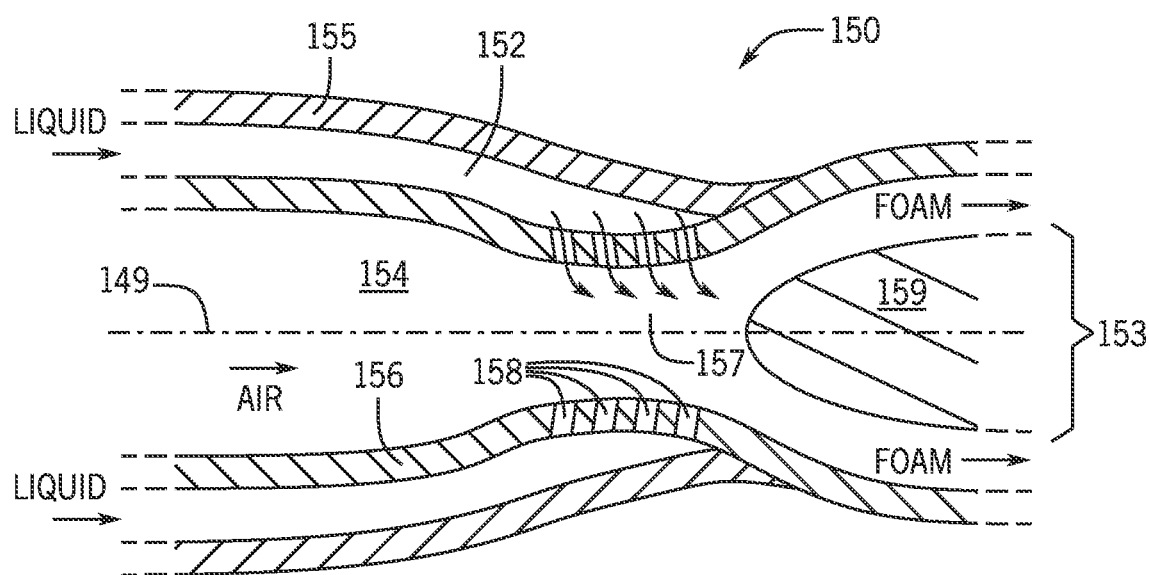
FIG. 9 is a cross-sectional view of an embodiment of an in situ foam generating device for use in a foam generating assembly of a turbine engine cleaning system, in accordance with an aspect of the present disclosure.

For example, FIG. 9 is a cross-sectional view of an embodiment of an in situ foam generating eductor 150. In the illustrated embodiment, the eductor 150 includes an outer fluid path 152 configured to receive liquid detergent (e.g., citric based detergent), an inner fluid path 154 configured to receive aerating gas (e.g., air), and an interface 156 between the outer fluid path 152 and the inner fluid path 154. The outer fluid path 152 is disposed between the interface 156 and an outer (e.g., annular) wall 155 of the eductor 150. The inner fluid path 154 and the outer fluid path 152 are arranged about a longitudinal axis 149 (e.g., the inner fluid path 154 and the outer fluid path 152 are concentric and centered on the longitudinal axis 149). The interface 156 in the illustrated embodiment is a wall having openings 158 through which the liquid detergent passes from the outer fluid path 152 to the inner fluid path 154. In some embodiments, a flow biasing device may cause the liquid to pass through the openings 158. Additionally or alternatively, the structure of the eductor 150 may enable the Venturi principle, where the flow of the aerating gas through a throat 157 (e.g., Venturi) of the inner path 154 causes a low pressure area proximate the openings 158 of the interface 156 that draws the liquid 152 through the openings 158 of the interface 156. In other words, the eductor 150 causes the flow of the aerating gas through the throat 157 of the inner path 154 to perform the work of pumping the liquid detergent from the outer path 152 into the inner path 154. The liquid detergent and the aerating gas may mix within (and/or downstream of) the throat 157 to generate foam, and the foam may be output at an outlet 153 of the eductor 150. An island 159 may be positioned downstream of the throat 157, which may enhance mixing of the detergent and aerating gas.

Figure 10:
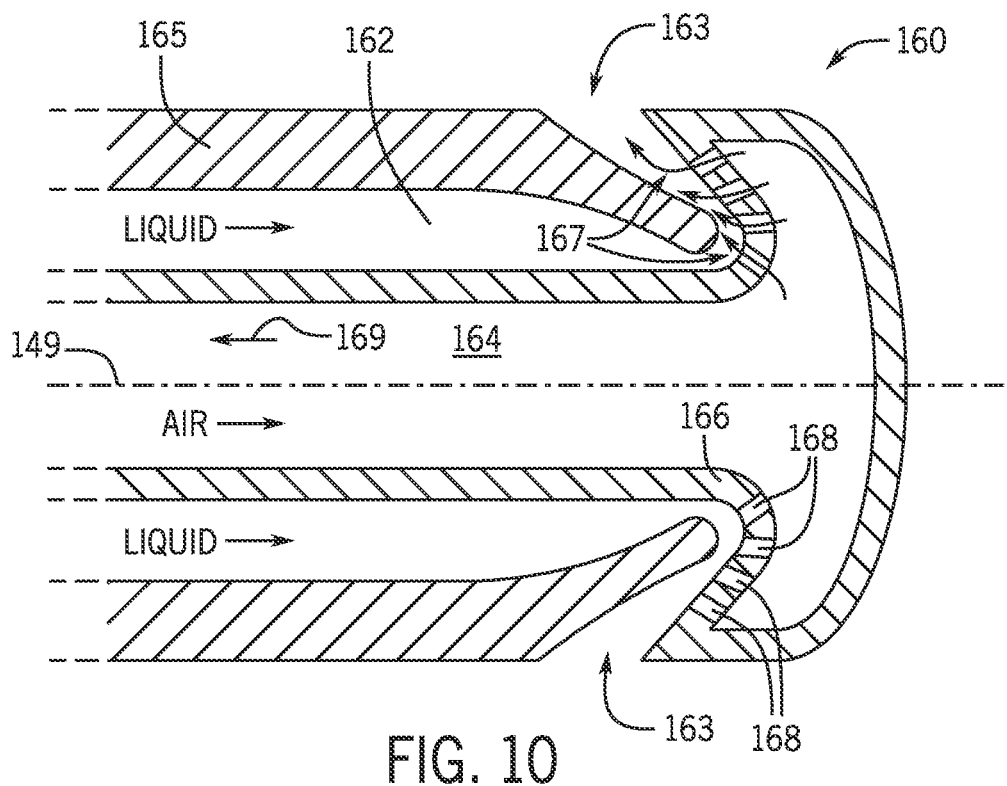
FIG. 10 is a cross-sectional view of another embodiment of an in situ foam generating device for use in a foam generating assembly of a turbine engine cleaning system, in accordance with an aspect of the present disclosure.

FIG. 10 is a cross-sectional view of an embodiment of an in situ foam generating air mixer 160. In the illustrated embodiment, the air mixer 160 includes an outer fluid path 162 configured to receive liquid detergent (e.g., citric based detergent), an inner fluid path 164 configured to receive aerating gas (e.g., air), and an interface 166 between the outer fluid path 162 and the inner fluid path 164. The outer fluid path 162 is disposed between the interface 166 and an outer (e.g., annular) wall 165 of the air mixer 160. The inner fluid path 164 and the outer fluid path 162 are arranged about a longitudinal axis 149 (e.g., the inner fluid path 164 and the outer fluid path 162 are concentric and centered on the longitudinal axis 149). The interface 166 in the illustrated embodiment is a wall having openings 168 through which the air passes from the inner fluid path 164 to a mixing region 167 between the outer fluid path 162 and the outlet 163 (e.g., along the bottleneck between the outer fluid path 162 and the outlet 163). The liquid detergent and the aerating gas may mix within the mixing area 167 to generate foam, and the foam may be output at an outlet 163 of the air mixer 160. In the illustrated embodiment, the outlet 163 is disposed at the outer (e.g., annular) wall 165. In some embodiments, the air mixer 160 may be oriented (during operation/foam generation) such that Earth's gravity vector 169 opposes the flow of the detergent and the aerating gas.

Figure 11:
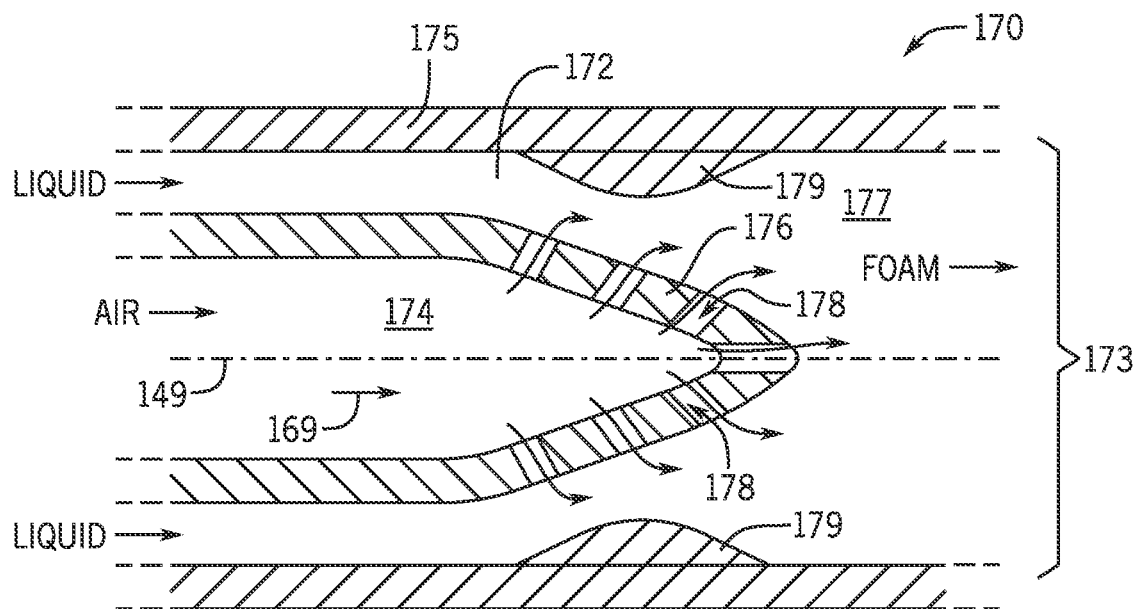
FIG. 11 is a cross-sectional view of another embodiment of an in situ foam generating device for use in a foam generating assembly of a turbine engine cleaning system, in accordance with an aspect of the present disclosure.

FIG. 11 is a cross-sectional view of another embodiment of an in situ foam generating air mixer 170. In the illustrated embodiment, the air mixer 170 includes an outer fluid path 172 configured to receive liquid detergent (e.g., citric based detergent), an inner fluid path 174 configured to receive aerating gas (e.g., air), and an interface 176 between the outer fluid path 172 and the inner fluid path 174. The outer fluid path 172 is disposed between the interface 176 and an outer (e.g., annular) wall 175 of the air mixer 170. The inner fluid path 174 and the outer fluid path 172 are arranged about a longitudinal axis 149 (e.g., the inner fluid path 174 and the outer fluid path 172 are concentric and centered on the longitudinal axis 149). The interface 176 in the illustrated embodiment is a wall having openings 178 through which the air passes from the inner fluid path 174 to the outer fluid path 176. The liquid detergent and the aerating gas may mix within a mixing area 177 to generate foam, and the foam may be output at an outlet 173 of the air mixer 170. Ridges 179 positioned on the outer wall 175 of the device 170, and protruding inward from the outer wall 175, may facilitate control of a pressure drop adjacent the mixing area 177 and/or enhance mixing of the detergent and air. The outlet 173 is disposed at an end of the air mixer 170, as opposed to along the outer (e.g., annular) wall 175. In some embodiments, the air mixer 170 may be oriented (during operation/foam generation) such that Earth's gravity vector 169 does not oppose the flow of the detergent and the aerating gas. In other words, Earth's gravity vector 169 may cause the detergent and the aerating gas to travel toward the outlet 173 in the illustrated air mixer 170, such that liquid detergent does not seep into the inner fluid path 174.

Figure 12:
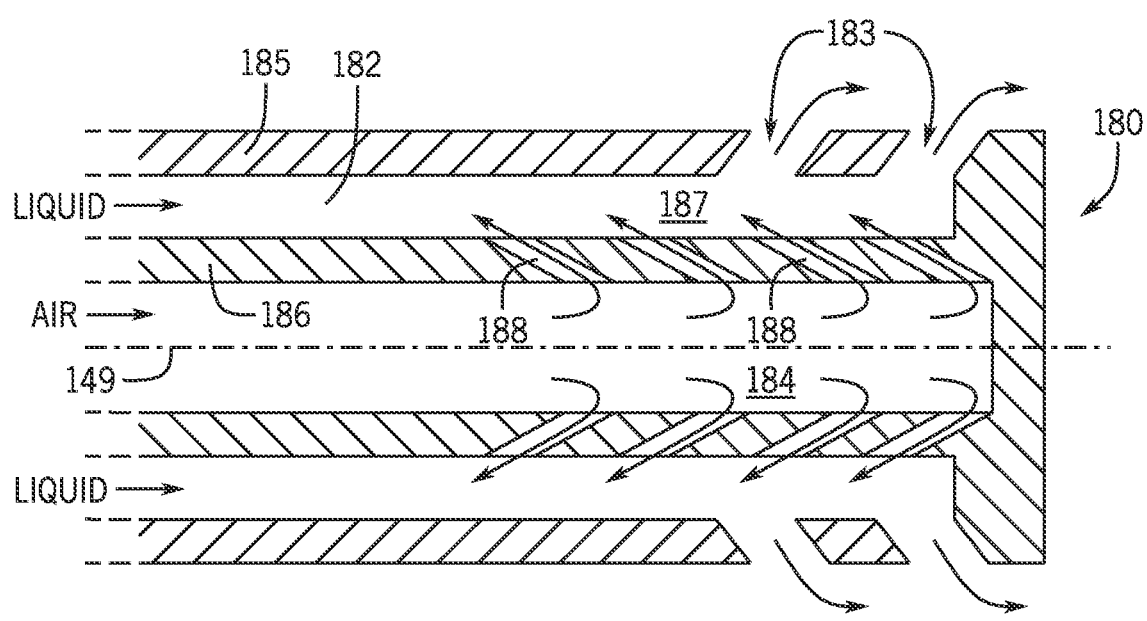
FIG. 12 is a cross-sectional view of another embodiment of an in situ foam generating device for use in a foam generating assembly of a turbine engine cleaning system, in accordance with an aspect of the present disclosure.

FIG. 12 is a cross-sectional view of another embodiment of an in situ foam generating air mixer 180. In the illustrated embodiment, the air mixer 180 includes an outer fluid path 182 configured to receive liquid detergent (e.g., citric based detergent), an inner fluid path 184 configured to receive aerating gas (e.g., air), and an interface 186 between the outer fluid path 182 and the inner fluid path 184. The outer fluid path 182 is disposed between the interface 186 and an outer (e.g., annular) wall 185 of the air mixer 180. The inner fluid path 184 and the outer fluid path 182 are arranged about a longitudinal axis 149 (e.g., the inner fluid path 184 and the outer fluid path 182 are concentric and centered on the longitudinal axis 149). The interface 186 in the illustrated embodiment is a wall having openings 188 through which the air passes from the inner fluid path 184 to the outer fluid path 182. The liquid detergent and the aerating gas may mix within a mixing area 187 to generate foam, and the foam may be output at one or more outlets 183 of the air mixer 180. The outlets 183 are disposed at the outer (e.g., annular) wall 175, as opposed to an end or end cap of the air mixer 180.

Figure 13:
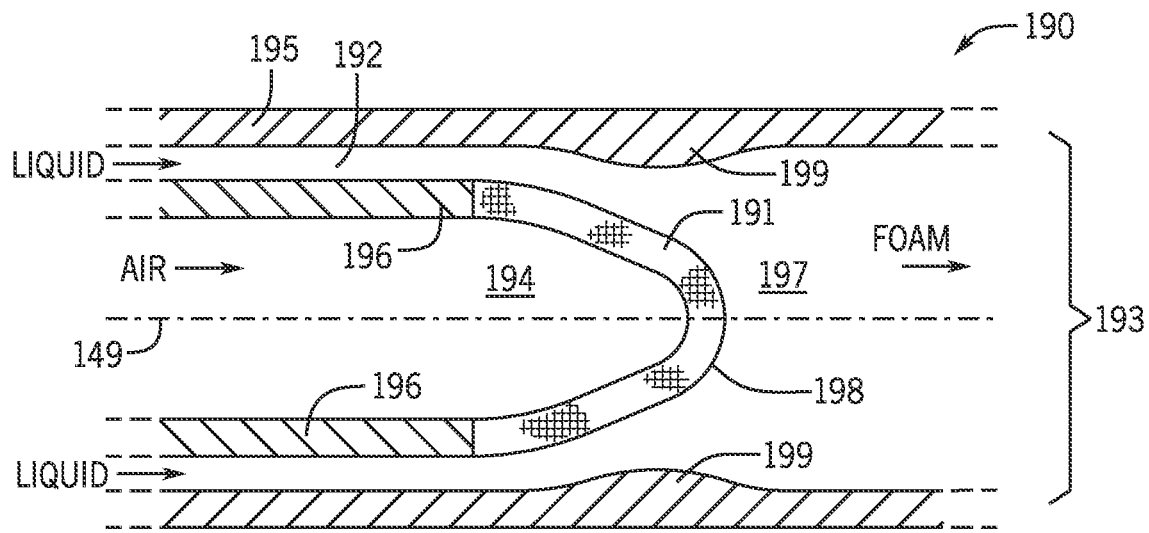
FIG. 13 is a cross-sectional view of another embodiment of an in situ foam generating device for use in a foam generating assembly of a turbine engine cleaning system, in accordance with an aspect of the present disclosure.

FIG. 13 is a cross-sectional view of embodiment of an in situ foam generating porous air mixer 190 having an inner wicking cap 191. In the illustrated embodiment, the porous air mixer 190 includes an outer fluid path 192 configured to receive liquid detergent (e.g., citric based detergent), an inner fluid path 194 configured to receive aerating gas (e.g., air), and an interface 196 between the outer fluid path 192 and the inner fluid path 194. The outer fluid path 192 is disposed between the interface 196 and an outer (e.g., annular) wall 195 of the porous air mixer 190. The inner fluid path 194 and the outer fluid path 192 are arranged about a longitudinal axis 149 (e.g., the inner fluid path 194 and the outer fluid path 192 are concentric and centered on the longitudinal axis 149). The interface 196 in the illustrated embodiment is an annular wall having the internal wicking cap 191 disposed at an end of the annular wall. The internal wicking cap 191 may be soaked with the liquid detergent passing through the outer fluid path 192. In the illustrated embodiment, ridges 199 on an inside of the outer (e.g., annular) wall 195 may protrude radially inward and facilitate control of (e.g., reduce) a pressure drop adjacent the ridges 199, and/or mixing of the detergent and air. Further, the aerating gas may pass through the internal wicking cap 191 having the detergent soaked therein. Thus, as the aerating gas passes through the detergent-soaked internal wicking cap 191, foam bubbles may be produced within the wicking cap 191, along a surface 198 of the internal wicking cap 191, and in an area 197 immediately downstream of the internal wicking cap 191. The bubbles may be output at the outlet 193 of the porous air mixer 190 illustrated in FIG. 13.

Figure 14:
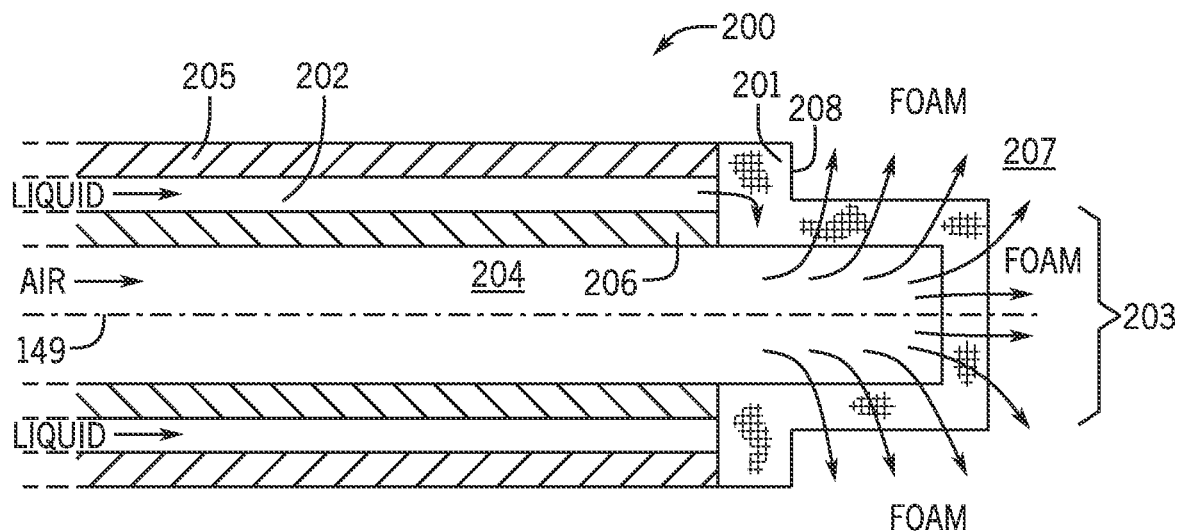
FIG. 14 is a cross-sectional view of another embodiment of an in situ foam generating device for use in a foam generating assembly of a turbine engine cleaning system, in accordance with an aspect of the present disclosure.

FIG. 14 is a cross-sectional view of another embodiment of an in situ foam generating porous air mixer 200 having an end wicking cap 201. In the illustrated embodiment, the porous air mixer 200 includes an outer fluid path 202 configured to receive liquid detergent (e.g., citric based detergent), an inner fluid path 204 configured to receive aerating gas (e.g., air), and an interface 206 between the outer fluid path 202 and the inner fluid path 204. The outer fluid path 202 is disposed between the interface 206 and an outer (e.g., annular) wall 205 of the porous air mixer 200. The inner fluid path 204 and the outer fluid path 202 are arranged about a longitudinal axis 149 (e.g., the inner fluid path 204 and the outer fluid path 202 are concentric and centered on the longitudinal axis 149). The interface 206 in the illustrated embodiment is an annular wall having the end wicking cap 201 disposed at an end of the annular wall. The end wicking cap 201 spans between the annular wall of the interface 206 and the outer (e.g., annular) wall 205 radially outward from the outer fluid path 202. The end wicking cap 201 may be soaked with the liquid detergent passing through the outer fluid path 202. Further, the aerating gas may pass through the end wicking cap 201 having the detergent soaked therein. Thus, as the aerating gas passes through the detergent-soaked end wicking cap 201, foam bubbles may be produced within the end wicking cap 201, along a surface 208 of the wicking cap 201, and in an area 207 immediately downstream of the end wicking cap 201 (e.g., within the fluid passageway of the turbine engine). Accordingly, the outlet 203 in the illustrated embodiment may be the end wicking cap 201 itself.

Figure 15:
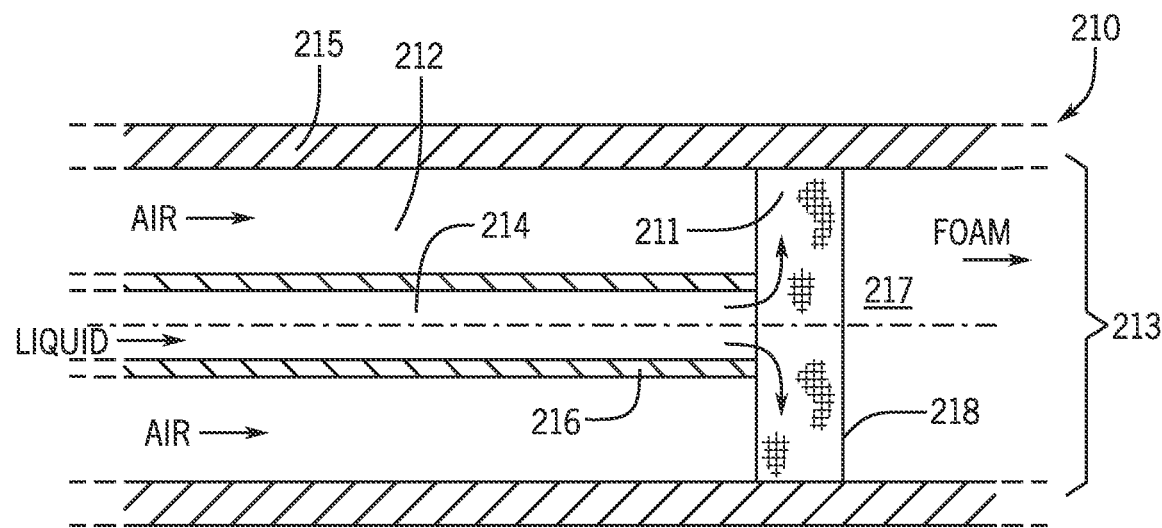
FIG. 15 is a cross-sectional view of another embodiment of an in situ foam generating device for use in a foam generating assembly of a turbine engine cleaning system, in accordance with an aspect of the present disclosure.

FIG. 15 is a cross-sectional view of another embodiment of an in situ foam generating porous air mixer 210 having a porous wicking insert 211. In the illustrated embodiment, the porous air mixer 210 includes an outer fluid path 212 configured to receive aerating gas (e.g., air), an inner fluid path 214 configured to receive liquid detergent (e.g., citric based detergent), and an interface 216 between the outer fluid path 212 and the inner fluid path 214. The outer fluid path 212 is disposed between the interface 216 and an outer (e.g., annular) wall 215 of the porous air mixer 210. The inner fluid path 214 and the outer fluid path 212 are arranged about a longitudinal axis 149 (e.g., the inner fluid path 214 and the outer fluid path 212 are concentric and centered on the longitudinal axis 149). The interface 216 in the illustrated embodiment is an annular wall having the wicking insert 211 disposed at an end of the annular wall. The wicking insert 211 may be soaked with the liquid detergent passing through the inner fluid path 214. In the illustrated embodiment, the wicking insert 211 between the inner surface of the outer (e.g., annular) wall 215 positioned radially outward from the outer fluid path 212. The wicking insert 211 also contacts an end of the annular wall portion of the interface 216. The aerating gas may pass through the wicking insert 211 having the detergent soaked therein. Thus, as the aerating gas passes through the detergent-soaked wicking insert 211, foam bubbles may be produced within the wicking insert 211, along a surface 218 of the wicking insert 211, and in an area 217 immediately downstream of the wicking insert 211. The bubbles may be output at the outlet 213 of the porous air mixer 210 illustrated in FIG. 15.

Figure 16:
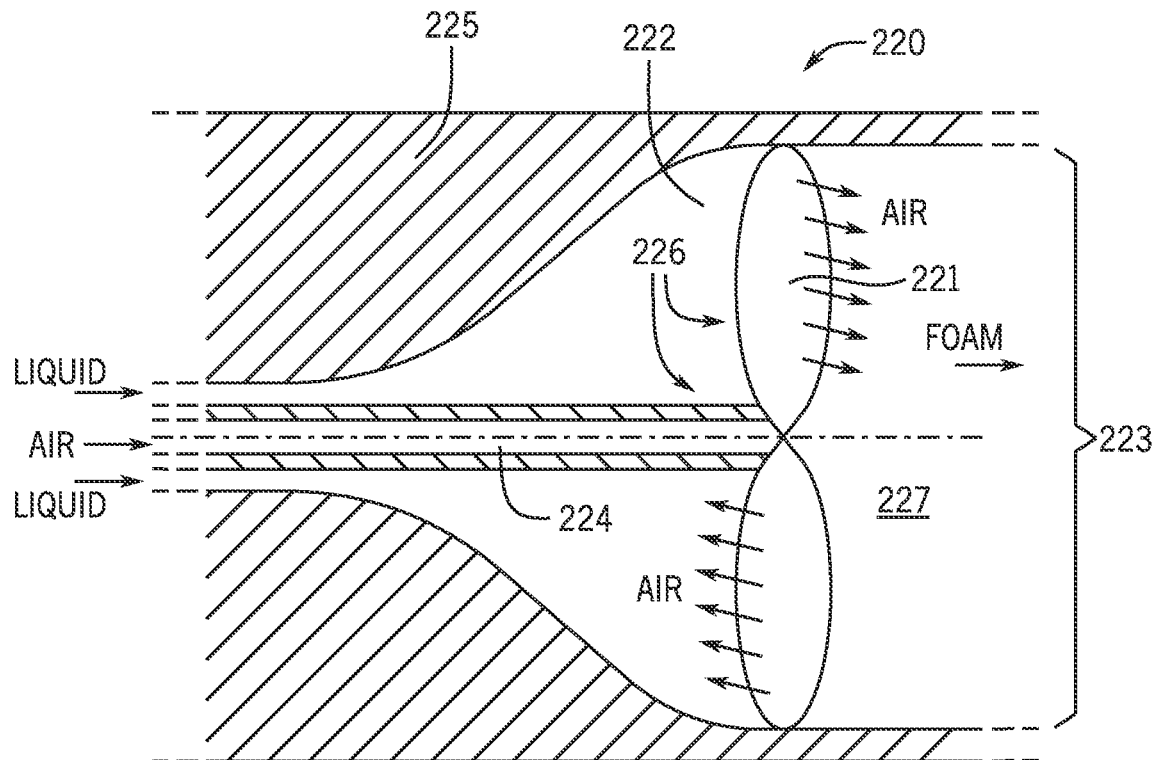
FIG. 16 is a cross-sectional view of another embodiment of an in situ foam generating device for use in a foam generating assembly of a turbine engine cleaning system, in accordance with an aspect of the present disclosure.

FIG. 16 is a cross-sectional view of an embodiment of an in situ foam generating spinner device 220. In the illustrated embodiment, the spinner device 220 includes an outer fluid path 222 configured to receive liquid detergent (e.g., citric based detergent), an inner fluid path 224 configured to receive aerating gas (e.g., air), and an interface 226 between the outer fluid path 222 and the inner fluid path 224. The outer fluid path 222 is disposed between the interface 226 and an outer (e.g., annular) wall 225 of the spinner device 220. The inner fluid path 224 and the outer fluid path 222 are arranged about a longitudinal axis 149 (e.g., the inner fluid path 224 and the outer fluid path 222 are concentric and centered on the longitudinal axis 149). The interface 226 in the illustrated embodiment includes a wall and a spinner 221 (e.g., fan, blower, fan wheel, blades, etc.). The spinner 221 may turn to draw the aerating gas toward the spinner 221, and to mix the aerating gas with the detergent flowing through the outer fluid path 222 toward the spinner 221. Thus, foam bubbles may be generated at the spinner 221 and in an area 227 immediately downstream from the spinner 221. The bubbles may be output at the outlet 223 of the spinner device 220 in the illustrated embodiment.

Figure 17:
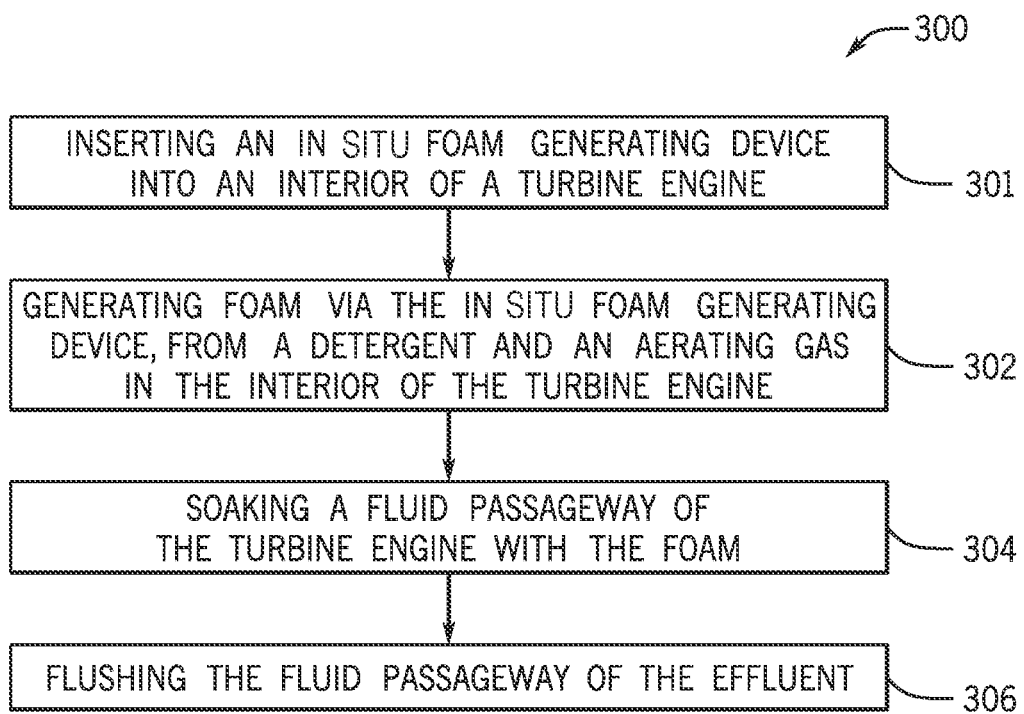
FIG. 17 is an embodiment of a method of cleaning a turbine engine with a cleaning system having a foam generating assembly that includes an in situ foam generating device, in accordance with an aspect of the present disclosure.

FIG. 17 is an embodiment of a method 300 of cleaning a turbine engine. In the illustrated embodiment, the method 300 includes inserting (block 301) an in situ foam generating device of a foam generating assembly of a cleaning system into an interior a turbine engine. For example, the in situ foam generating device may be inserted through a port of the turbine engine (e.g., a borescope inspection port, an ignitor port, a fuel nozzle orifice, or another port), a throat of the turbine engine, or between blades and a stator of the turbine engine. In some embodiments, the in situ foam generating device (or another portion or component of the foam generating assembly) may include a coupling mechanism that interfaces with (e.g., clamps onto) a feature of the turbine engine, such as a wall of the turbine engine surrounding the port through which the in situ foam generating device is disposed, to maintain a position of the in situ foam generating device within the interior of turbine engine.

The method also includes generating (block 302) foam, via the in situ foam generating device, from a detergent and an aerating gas in the interior (e.g., fluid passageway) of the turbine engine. For example, as described above, the detergent and the aerating gas may be individually and/or separately routed to an in situ foam generating device positioned within the turbine engine. The in situ foam generating device may receive the aerating gas and the detergent, and may mix the aerating gas and the detergent to form the foam. The foam may be output from the in situ foam generating device to an internal area of the turbine engine.

The method 300 also includes soaking (block 304) a fluid passageway of the turbine engine with the foam. For example, the foam may contact surfaces of the turbine engine and may soak the surfaces of the turbine engine for a period of time. In some embodiments, the turbine engine may be turned as the foam travels through the turbine engine, which may cause the foam to contact a greater number or percentage of surfaces of the turbine engine.

The method 300 may also include rinsing or flushing (block 306) the fluid passageway of the turbine engine after the above-described soaking procedure. For example, as the foam contacts the surfaces of the turbine engine in the fluid passageway, the foam may loosen, break down, or otherwise remove contaminants disposed on the surfaces of the turbine engine. As the contaminants are removed, the foam may collapse into an effluent having the detergent, the contaminants, and other materials (e.g., surfactants) that may be mixed with, or a part of, the detergent. The effluent may then be rinsed or flushed from the fluid passageway.

It should be noted that the method 300 may include the use of several in situ foam generating devices configured to generate foam at various locations internal to the turbine engine. For example, the in situ foam generating devices may be inserted through various ports and orifices of the turbine engine. Each in situ foam generating device may include independent aerating gas and detergent sources, or the in situ foam generating devices may receive aerating gas form the same aerating gas source, and detergent from the same detergent source. By utilizing multiple in situ foam generating devices simultaneously, several targets internal to the turbine engine can be cleaned simultaneously, and the foam generated by each foam generating device is only responsible for cleaning areas adjacent to the particular device. Further still, the in situ foam generating devices may be used exclusively, or together with other foam generating assemblies or devices that clean certain portions of the turbine engine.

Technical effects of the invention include improved cleaning accuracy, improved cleaning efficiency, and cost savings over traditional embodiments having external foam generation. For example, as described above, in situ foam generation reduces a traversal distance of the generated foam between the generating device and the target cleaning surface in the interior of the turbine engine. By reducing the traversal distance, bubble diameters and bubble collapse are more controllable. Further, for the above reasons, more cost effective materials (e.g., having a lower foam stability) may be used to achieve the same or better cleaning results (e.g., accuracy, efficiency) compared to traditional embodiments having external foam generation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A turbine system, comprising:
a turbine engine;
an aerating gas hose;
a water-based foaming liquid detergent hose; and
an in situ foam generating device disposed in the turbine engine, wherein the in situ foam generating device comprises a maximum width sized to pass through a minimum width of a port of the turbine engine, wherein the in situ foam generating device is coupled to the aerating gas hose passing through the port of the turbine engine and the water-based foaming liquid detergent hose passing through the port of the turbine engine, wherein the in situ foam generating device comprises a body having a first end, a second end, and an outer wall extending from the first end to the second end and having the maximum width of the in situ foam generating device, wherein the aerating gas hose and the water-based foaming liquid detergent hose are coupled to the first end inward from the maximum width of the outer wall, and wherein the in situ foam generating device comprises:
an inner fluid path and an outer fluid path at least partially surrounding the inner fluid path, wherein the inner fluid path is configured to receive one of a water-based foaming liquid detergent from the water-based foaming liquid detergent hose or an aerating gas from the aerating gas hose, and wherein the outer fluid path is configured to receive the other of the water-based foaming liquid detergent from the water-based foaming liquid detergent hose or the aerating gas from the aerating gas hose, respectively; and
an interface between the inner fluid path and the outer fluid path, wherein the interface is configured to enable mixing of the aerating gas with the water-based foaming liquid detergent to generate foam.

2. The turbine system of claim 1, wherein the interface comprises a wall disposed between the inner fluid path and the outer fluid path, wherein the wall comprises openings fluidly coupling the inner fluid path and the outer fluid path.

3. The turbine system of claim 1, wherein the port is a borescope inspection port.

4. The turbine system of claim 1, wherein the aerating gas is air or nitrogen.

5. The turbine system of claim 1, wherein the inner fluid path is configured to receive the water-based foaming liquid detergent from the water-based foaming liquid detergent hose, and wherein the outer fluid path is configured to receive the aerating gas from the aerating gas hose.

6. The turbine system of claim 1, wherein the outer fluid path is configured to receive the water-based foaming liquid detergent from the water-based foaming liquid detergent hose, and wherein the inner fluid path is configured to receive the aerating gas from the aerating gas hose.

7. The turbine system of claim 2, wherein the in situ foam generating device is an in situ foam generating eductor, wherein a structure of the eductor is configured to enable a flow of the aerating gas through a throat of the inner fluid path to cause a low pressure area proximate the openings of the interface that draws the water-based foaming liquid detergent through the openings of the interface.

8. The turbine system of claim 1, wherein the in situ foam generating device is an in situ foam generating air mixer.

9. The turbine system of claim 1, wherein the in situ foam generating device has an outlet disposed at an outer annular wall.

10. The turbine system of claim 1, wherein the in situ foam generating device has an outlet disposed at an end of the in situ foam generating device.

\* \* \* \* \*